(12) United States Patent
Steininger et al.

(10) Patent No.: US 7,677,671 B2
(45) Date of Patent: Mar. 16, 2010

(54) PASSENGER RESTRAINT APPARATUS FOR FUNFAIR RIDES

(75) Inventors: Walter Steininger, Offenberg (DE); Erwin Kraus, Offenberg (DE); Roland Gmeinwieser, Offenberg (DE)

(73) Assignee: Zierer Karussell und Spezialmaschinenbau GmbH, Deggendorf (DE)

( * ) Notice: Subject to any disclaimer, the term of this patent is extended or adjusted under 35 U.S.C. 154(b) by 0 days.

(21) Appl. No.: 12/011,261

(22) Filed: Jan. 25, 2008

(65) Prior Publication Data
US 2008/0179937 A1 Jul. 31, 2008

(30) Foreign Application Priority Data
Jan. 26, 2007 (DE) .................. 20 2007 001 485 U

(51) Int. Cl.
*B60R 21/00* (2006.01)
(52) U.S. Cl. ........................................ 297/488; 297/487
(58) Field of Classification Search .................. 297/487, 297/488, 466, 464, 115, 256.15; 472/59, 472/60, 130, 43; 104/53
See application file for complete search history.

(56) References Cited

U.S. PATENT DOCUMENTS

| 3,393,010 | A | * | 7/1968 | Steinberg | 297/487 |
|---|---|---|---|---|---|
| 3,888,329 | A | * | 6/1975 | Monaghan | 280/734 |
| 4,085,967 | A | * | 4/1978 | Spencer | 297/115 |
| 4,280,731 | A | * | 7/1981 | Pitts et al. | 297/487 |

(Continued)

FOREIGN PATENT DOCUMENTS

DE          20314975 U1        2/2005
DE          69918047 T2        7/2005
DE        202005001372 U1      6/2006

(Continued)

*Primary Examiner*—David Dunn
*Assistant Examiner*—James Alex
(74) *Attorney, Agent, or Firm*—Townsend and Townsend and Crew LLP

(57) ABSTRACT

A passenger restraint apparatus for funfair rides is disclosed. It includes:
   a restraint body (30) having a leg support surface (31) which is adapted to be placed on the thighs of the passenger, and
   a first guide lever (40) which is fixed at its first end to the restraint body and which is pivotably coupled with its second end in the floor region in front of a passenger seat of a funfair ride in such a way that the restraint body can be pivoted in relation to the passenger seat about a first lower axis (61) which is disposed in transverse relationship to the longitudinal axis of the thigh of the seated passenger from an opened position into a closed position,
characterized in that
the first guide lever is coupled at its first end to the restraint body pivotably about a first upper axis (34) which is disposed in parallel relationship with the first lower axis and
arranged adjacent to the first guide lever is a second guide lever (50) which
i. is spaced from the first guide lever in a direction in transverse relationship with the first lower axis and
ii. is coupled at its first end to the restraint body pivotably about a second upper axis (35) which is arranged in parallel spaced relationship with the first upper axis and
iii. is coupled at its second end pivotably about a second lower axis (62) arranged in parallel spaced relationship with the first lower axis in the region of the passenger footrest of a funfair ride, in such a way
iv. that the restraint body is guided by the first and second guide levers (40, 50) in the manner of a parallelogram or trapezium lever arrangement.

23 Claims, 6 Drawing Sheets

U.S. PATENT DOCUMENTS

Figure 1:
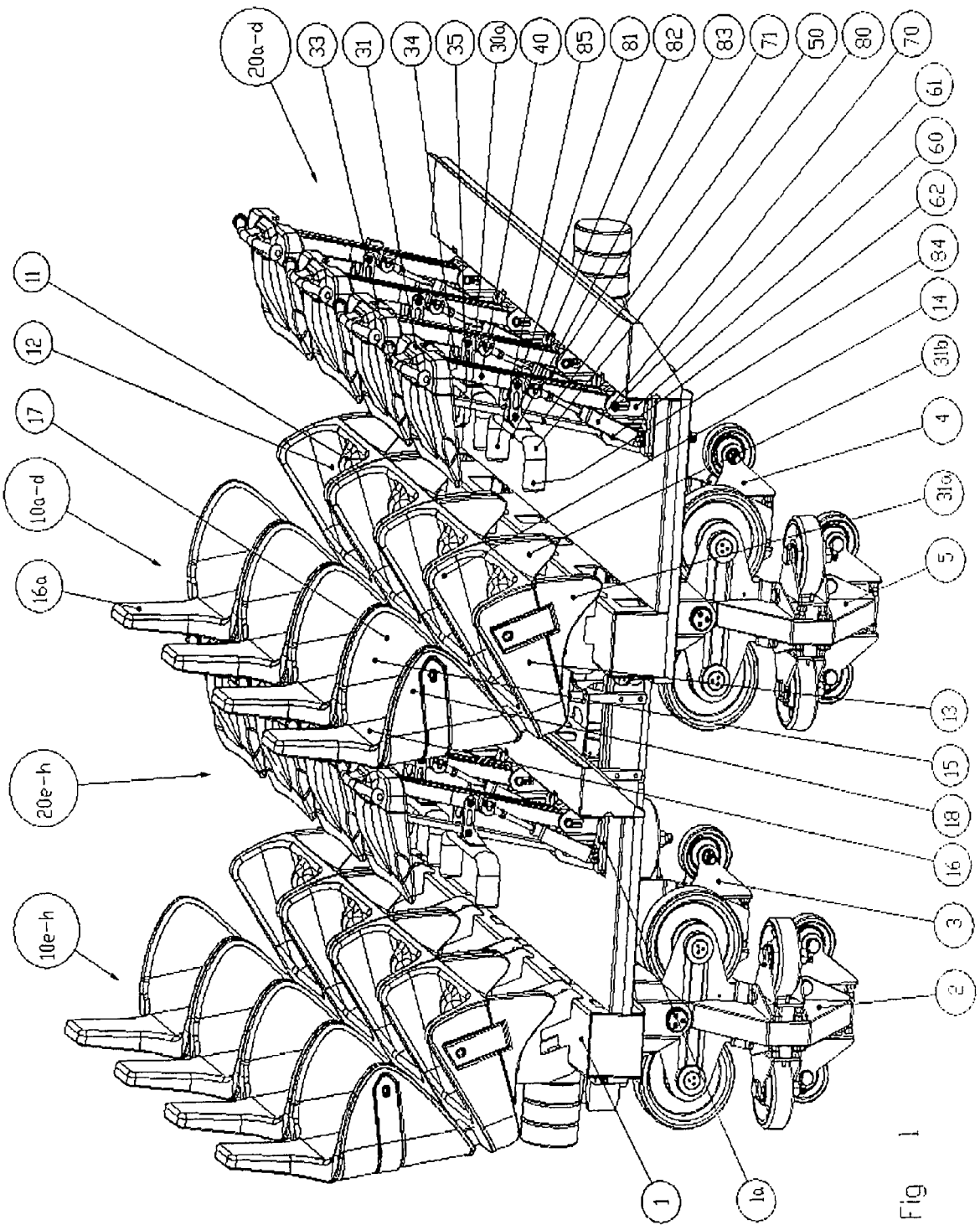

| | | | |
|---|---|---|---|
| 4,359,200 A * | 11/1982 | Brevard et al. | 244/122 AG |
| 5,499,844 A * | 3/1996 | Dirck | 280/748 |
| 5,660,437 A * | 8/1997 | Bauer et al. | 297/237 |
| 5,791,254 A * | 8/1998 | Mares et al. | 104/53 |
| 5,833,314 A * | 11/1998 | Mitschelen et al. | 297/237 |
| 5,853,193 A * | 12/1998 | Marshall | 280/748 |
| 6,113,500 A * | 9/2000 | Francis et al. | 472/60 |
| 6,287,211 B1 | 9/2001 | Bolliger | |
| 6,431,989 B1 * | 8/2002 | Katayama et al. | 472/60 |
| 6,513,441 B1 * | 2/2003 | Clerx et al. | 104/53 |
| 6,637,341 B2 * | 10/2003 | Kroon et al. | 104/53 |
| 6,971,718 B2 * | 12/2005 | Haglund | 297/236 |
| 7,094,157 B2 * | 8/2006 | Fromyer et al. | 472/59 |
| 7,204,559 B2 * | 4/2007 | Berra | 297/466 |

FOREIGN PATENT DOCUMENTS

| | | |
|---|---|---|
| EP | 1 020 212 A1 | 7/2000 |
| GB | 2 149 313 A | 6/1985 |
| WO | WO 99/22829 A | 5/1999 |
| WO | WO 99/22830 A | 5/1999 |

* cited by examiner

PASSENGER RESTRAINT APPARATUS FOR FUNFAIR RIDES

This application claims the priority of German Patent Application No. 20 2007 001 485.6, filed Jan. 26, 2007, the disclosure of which is incorporated herein by reference.

The invention concerns a passenger restraint apparatus for funfair rides, comprising a restraint body having a leg support surface which is adapted to be placed on the thighs of the passenger, and a first guide lever which is fixed at its first end to the restraint body and which is pivotably coupled with its second end in the floor region in front of a passenger seat of a funfair ride in such a way that the restraint body can be pivoted in relation to the passenger seat about a first lower axis which is disposed in transverse relationship to the longitudinal axis of the thigh of the seated passenger from an opened position into a closed position.

A passenger restraint apparatus of that kind is known from EP 1 020 212 B1. Such a passenger restraint apparatus serves to fix a passenger in a seat in such a way that he is not flung out of the seat under the effect of the forces and accelerations which occur due to the funfair ride. The known passenger restraint system can admittedly very substantially ensure that restraint function for funfair rides involving a certain form of movement but it still suffers from a series of disadvantages. Thus the known restraint apparatus suffers in particular from the risk that the passenger completely or partially eludes the restraint function of the restraint apparatus by virtue of active movements of his legs and thus exposes himself to the danger that he may be partially or completely flung out of his seat due to the movements of the ride.

It has further been found that the known passenger restraint apparatus can admittedly be appropriately designed and constructed for people of a given, very substantially uniform bodily stature but it is not capable of securely fixing passengers of differing stature, for example slim and corpulent passengers, adults and children, when using a single design and construction.

There is therefore a need for a restraint apparatus which both prevents the passenger from moving into an unsafe position by virtue of active movement and which also permits secure fixing of people of differing stature. The invention endeavours to meet that need.

Furthermore within that endeavour on the part of the invention there is the aim of providing a passenger restraint apparatus which admittedly securely fixes the passenger but in that respect causes a limitation on movement which subjectively is as slight as possible but instead gives a feeling of movement which is as free as possible, thereby enhancing the impression of the funfair ride and the experience of movement.

The object of the invention is to provide a restraint apparatus which attains at least some and preferably all of the foregoing endeavours and aims.

In accordance with the invention that object is attained by a passenger restraint apparatus as set forth in the opening part of this specification, in which the first guide lever is coupled at its first end to the restraint body pivotably about a first upper axis which is disposed in parallel relationship with the first lower axis and arranged adjacent to the first guide lever is a second guide lever which is functionally spaced from the first guide lever in a direction in transverse relationship with the first lower axis and is coupled at its first end to the restraint body pivotably about a second upper axis which is arranged in parallel spaced relationship with the first upper axis and is coupled at its second end pivotably about a second lower axis arranged in parallel spaced relationship with the first lower axis in the region of the passenger footrest of a funfair ride, in such a way that the restraint body is guided by the first and second guide levers in the manner of a parallelogram or trapezium lever arrangement.

The passenger restraint apparatus designed in that way provides that the passenger who is sitting in a passenger seat of the funfair ride is ideally fixed by the leg support surface of the restraint body being placed on the top side of his thighs, in which respect the specific configuration of the kinematics by virtue of the first and second guide levers make it possible that on the one hand passengers of differing stature can be securely fixed in the same fashion while on the other hand in that respect, for each bodily stature, ideal positioning of the leg support surface is achieved, going into the pelvic region of the passenger. In that respect the passenger restraint apparatus according to the invention can be used both for children and also for adults without different constructions or dimensions of the apparatus being required for that purpose. The design configuration with the first and second guide levers and the pivotable mounting at both ends both for the guide levers in the floor region in front of the passenger seat, that is to say ultimately in relation to the chassis of the passenger car of the funfair ride, and also in respect of the pivotable coupling of both guide levers to the restraint body avoids the disadvantage recognised by the inventor in known restraint apparatuses, namely that they only perform a pivotal movement of the restraint body about the axis near the floor, and instead of that it provides for a combined horizontal/vertical displacement of the restraint body, in which respect that occurs either without pivotal movement of the restraint body about a horizontal axis (in the case of the parallelogram arrangement) or a specific targeted pivotal movement about such a horizontal axis is achieved (in the case of the trapezium lever arrangement).

In accordance with the invention the term guide lever is used to denote a bar or the like which is pivotably mounted at both ends and transmits both forces which serve to guide the restraint body and also those which serve for ultimately fixing the passenger. In that respect the first and second guide levers can jointly perform those guidance and fixing tasks or one of the two guide levers can be dimensioned in particular for carrying and transmitting the fixing forces whereas the other guide lever is primarily dimensioned for implementing guidance tasks.

By virtue of its secure fixing of passengers in relation to any directions of movement and acceleration the passenger restraint apparatus according to the invention is suitable for funfair rides of all kinds including for example roller coasters with all ride configurations such as looping, corkscrew, helix, airtime and the like, as well as round funfair rides involving a multi-axis movement, in particular looping loops or performing somersaults and travelling upside down and the like.

In accordance with a first preferred embodiment the passenger restraint apparatus according to the invention in a development thereof can provide that the first and second guide levers are guided in mutually parallel relationship. That provides a parallelogram guide arrangement in respect of the restraint body, which has proven to be particularly suitable for many arrangements in relation to the passenger seat. With that design configuration consequently the restraint body can be moved on a defined circular path by the first and second guide levers without that involving a rotational movement of the restraint body about an axis which is parallel to the lower or upper axes of the guide lever mountings.

It is further preferred if the first and second guide levers are arranged in succession in the direction of the longitudinal axis of the thigh of the seated passenger. That form of arrangement on the one hand permits effective spacing of the two upper or the two lower pivot axes in the longitudinal direction of the thigh of the seated passenger while on the other hand it allows an arrangement of the two guide levers in a slender design configuration between the legs of the passenger. Besides that arrangement with a first and a second guide lever, the invention is also intended to embrace arrangements with more than a first and a second guide lever, for example arrangements in which a first and a second guide lever are respectively arranged to the left and the right of the legs of the passenger or arrangements in which a plurality of such guide levers are used jointly for a plurality of restraint bodies for restraining passengers who are sitting in a row one beside the other.

A further development of the passenger restraint apparatus according to the invention provides at least one linear actuator for pivotal movement of the restraint body between the opened and the closed positions, which is coupled with its first end pivotably to the first or second guide lever and which is fixed with its second end pivotably in the floor region in front of the passenger seat of the funfair ride. The linear actuator or the plurality of linear actuators can be for example in the form of locking cylinder units which perform a locking function by way of electrically actuated solenoid valves and which at the same time allow automatic opening and/or closing of the passenger restraint apparatus. In that respect the linear actuators can preferably be pivotably connected at one side to one of the two guide levers and on the other side to the chassis of the passenger car or alternatively on the other side to the other guide lever in order to achieve the desired movement and locking action.

In accordance with a further aspect of the invention a further development of the passenger restraint apparatuses set forth in the opening part of this specification or those described hereinbefore can provide a lower leg bow or yoke which is coupled to the first and/or second guide levers and arranged in transverse relationship with the longitudinal axis of the lower leg of the seated passenger in such a way that a knee bend angle of at least 90°, preferably 100°, is forced by the lower leg bow bearing against the front side of the lower legs of the seated passenger. By virtue of the biomechanics of the human hip and knee joint a passenger is able to actively wriggle out of a restraint apparatus in particular when the lower legs are freely movable. In addition actively wriggling out in that way can occur in particular when the passenger is in a position to stretch the legs, that is to say to assume a knee bend angle of 0°, or however to move the legs into an approximately stretched-out position, that is to say to move the knee into very small bend angles. In accordance with the invention it is therefore provided that the passenger restraint apparatus forces the passenger into a knee bend angle of at least 90°, preferably however larger knee bend angles, for example 100°, and thereby fixes the legs in an angled position which prevents the passenger from actively wriggling out and which in addition provides for particularly secure fixing of the passenger by way of his legs without in that respect overall giving rise to a subjective feeling of severe constriction or fixing.

In that respect it can be provided in particular that the lower leg bow is coupled to the first and second guide levers and guided by the first and second guide levers in the manner of a parallelogram or trapezium lever arrangement. Thus with this embodiment the lower leg bow can be coupled in particular to the first and second guide levers in the region between the upper and lower ends thereof. That design configuration permits synchronous guidance of the lower leg bow and the restraint body and can therefore achieve the desired passenger fixing effect, with a single closing movement.

In that respect it is particularly preferred if the lower leg bow is guided in parallel relationship with the restraint body. That parallel guidance of the lower leg bow and the restraint body ensures that the restraint apparatus according to the invention is suitable for passengers of differing bodily stature without modifications in the construction and dimensioning of the apparatus being required for that purpose.

Furthermore in a development of the passenger restraint apparatus with the lower leg bow or yoke it is preferred if the lower leg bow is of a U-shaped configuration with a first main portion which is oriented in transverse relationship with the longitudinal axis of the lower leg and which bears against the front side of the two lower legs of the seated passenger, and two side horns which are arranged at the two ends of the main portion and which extend approximately in the direction of the longitudinal axis of the thigh of the seated passenger and bear laterally against the lower legs of the seated passenger. That U-shaped configuration of the lower leg bow can ensure that the passenger cannot actively move out of the leg-holding condition which is the aim for a secure fixing action, by means of active outward pivotal movement of the lower legs, and thus the safety aspect of the restraint apparatus according to the invention can be further enhanced.

In accordance with a further aspect of the invention a further development of the passenger restraint apparatus as set forth in the opening part of this specification or the developments of the passenger restraint apparatuses according to the invention as described hereinbefore can provide a passenger seat having a seat surface and a backrest, wherein the seat surface is at an angle of about 80° relative to the backrest. It has been found in accordance with the invention that an angle of about 80° or less between the seat surface and the backrest puts the passenger into a posture which is advantageous in terms of safe secure fixing without thereby giving rise to a subjective impression of tight fixing on the part of the passenger. Particularly when that passenger seat geometry is combined with the guidance effect according to the invention for the restraint body by means of two guide levers and the lower leg bow according to the invention, the passenger can be put into a particularly desirable Z-shaped posture which is advantageous in terms of secure fixing and which does not give rise to a subjectively severely perceived feeling of constriction on the part of the passenger.

In accordance with a further aspect of the invention the restraint apparatus as set forth in the opening part of this specification or the restraint apparatuses described hereinbefore can be developed by a passenger seat having a seat surface and a backrest surface, wherein provided on the underside of the seat surface are two lateral lower leg contact surfaces which bear laterally against the lower legs of the seated passenger. That embodiment, in a similar fashion to the above-described U-shaped lower leg bow, makes it possible to prevent an outward rotation of the lower legs insofar as the two lower legs are laterally restricted in their movement by the lower leg contact surfaces. The embodiment is therefore suitable on the one hand as an alternative to the U-shaped configuration of the lower leg bow but, in order to permit a compact configuration for the lateral guide surfaces for the lower legs on the lower leg bow and at the underside of the seat surface, it can also be combined with the U-shaped lower leg bow in order to achieve a safe secure passenger fixing effect without the need for components which particularly greatly project.

In that respect, in terms of a combination of the lateral lower leg contact surfaces arranged at the underside of the seat surface, with the U-shaped lower leg bow, it is particularly preferred if the contact surfaces for the lower legs are arranged at the side horns of the U-shaped lower leg bow in aligned relationship with the lower leg contact surfaces provided on the underside of the seat surface or lie within the region delimited by the lower leg contact surfaces. That arrangement prevents the lower legs of the passenger being caught and jammed in the closing movement of the restraint apparatus between the elements at the seat surface side and at the lower leg bow side, which carry the contact surfaces.

Figure 2:
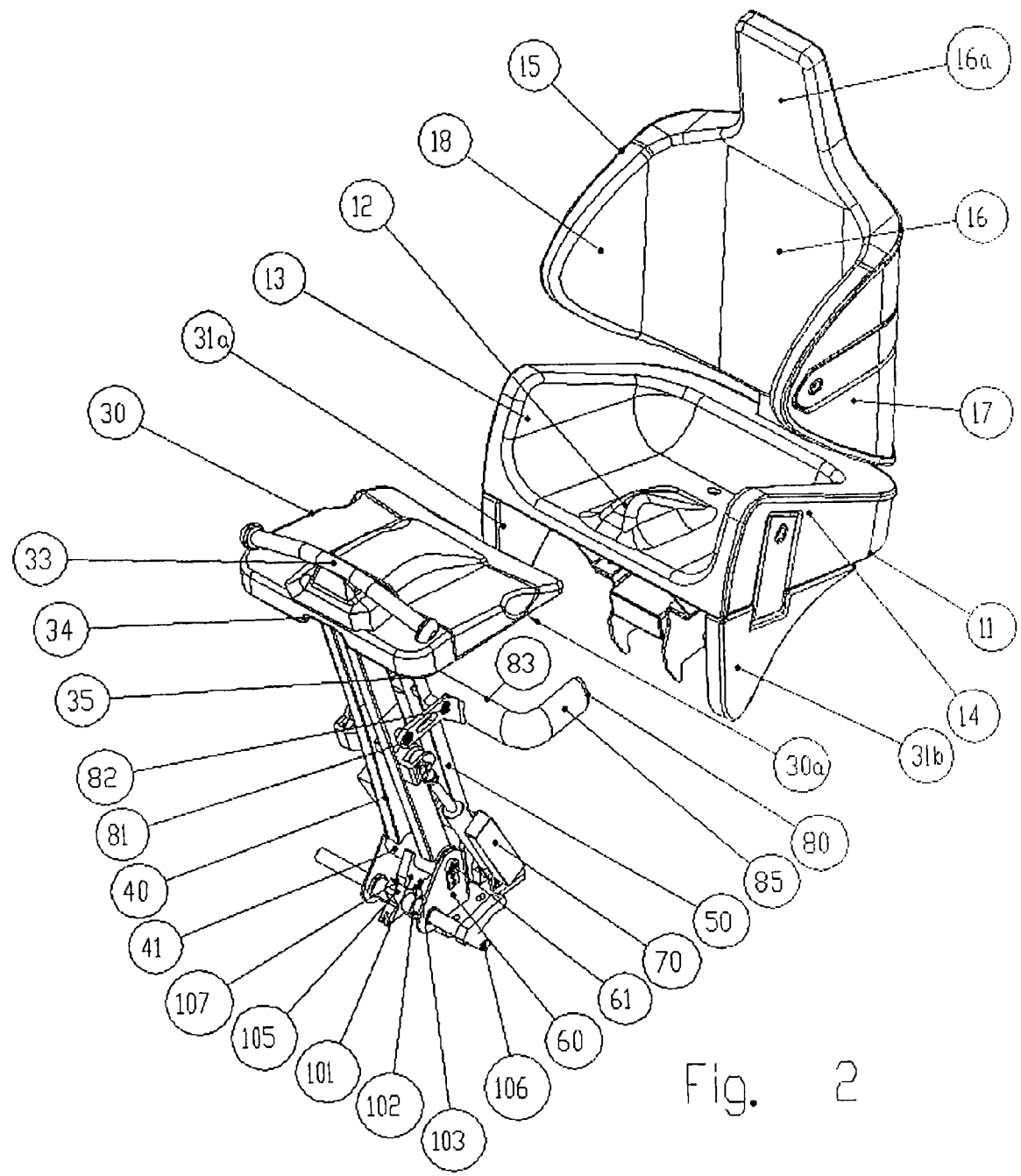
Figure 3:
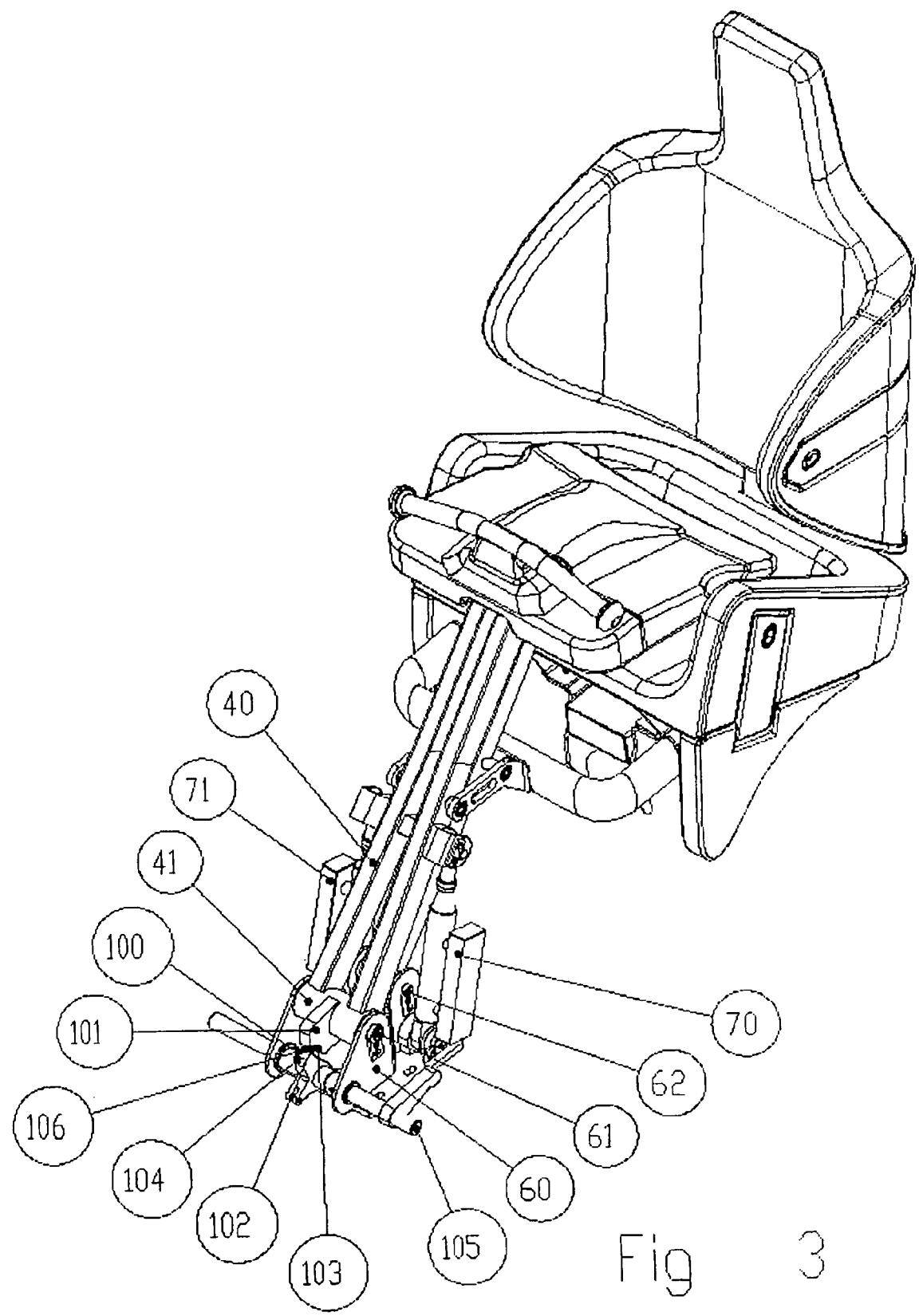
Figure 4:
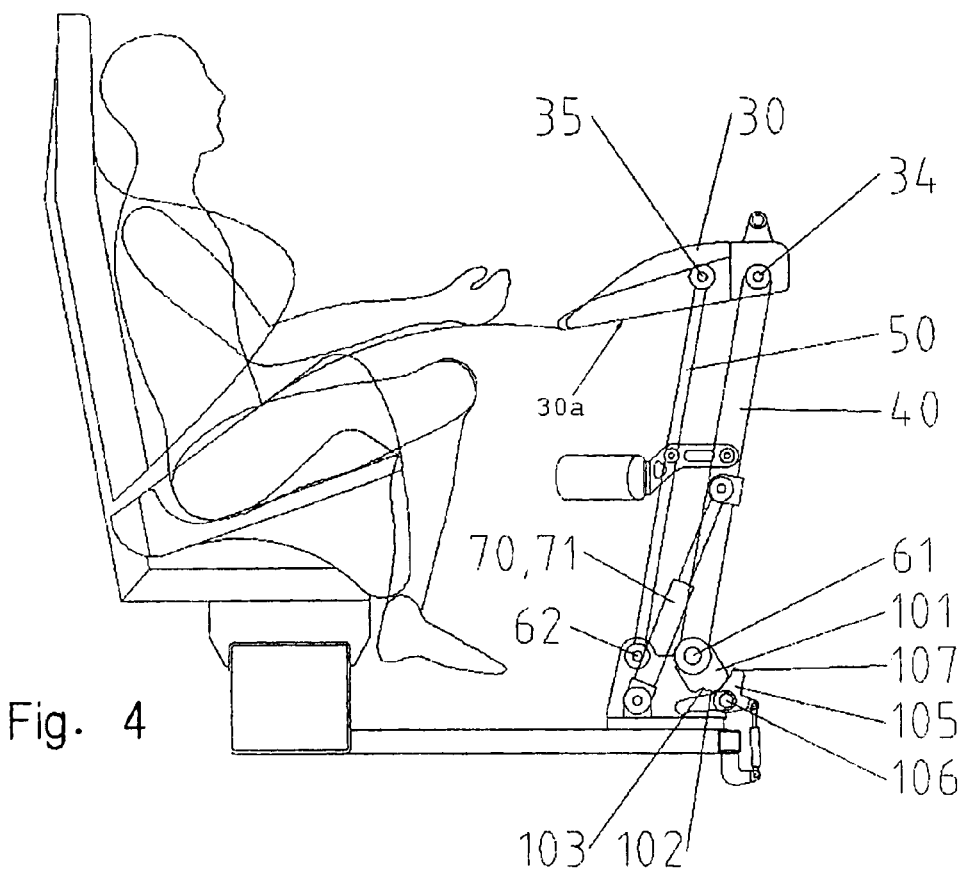
Figure 5:
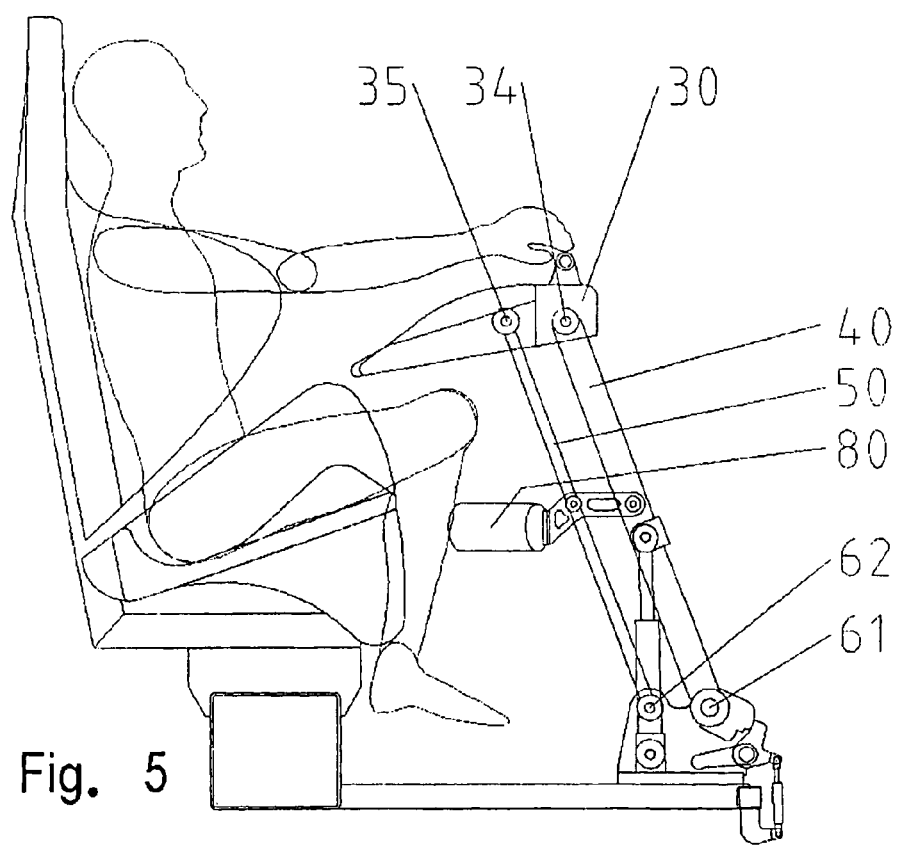
Figure 6:
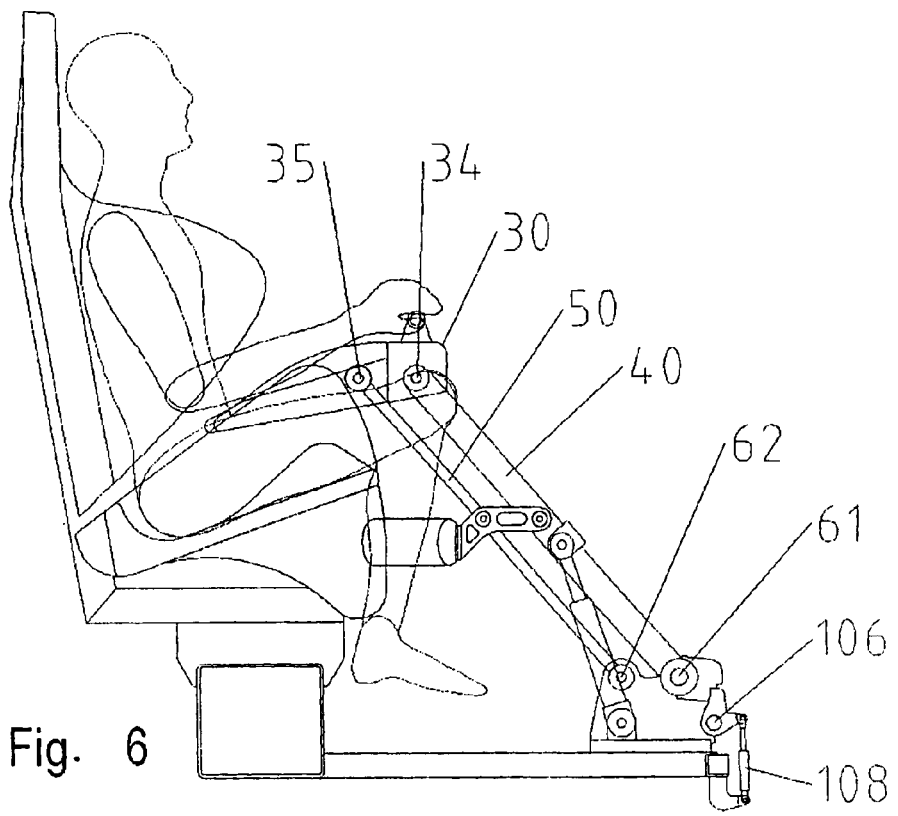
Figure 7:
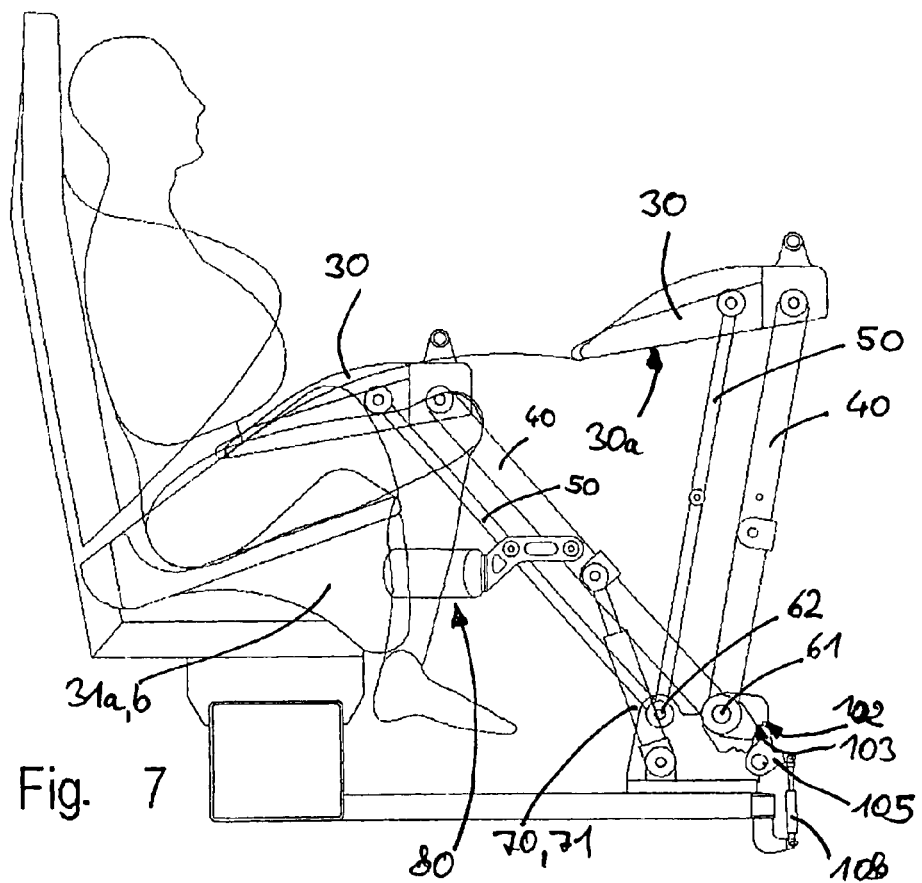
Figure 8:
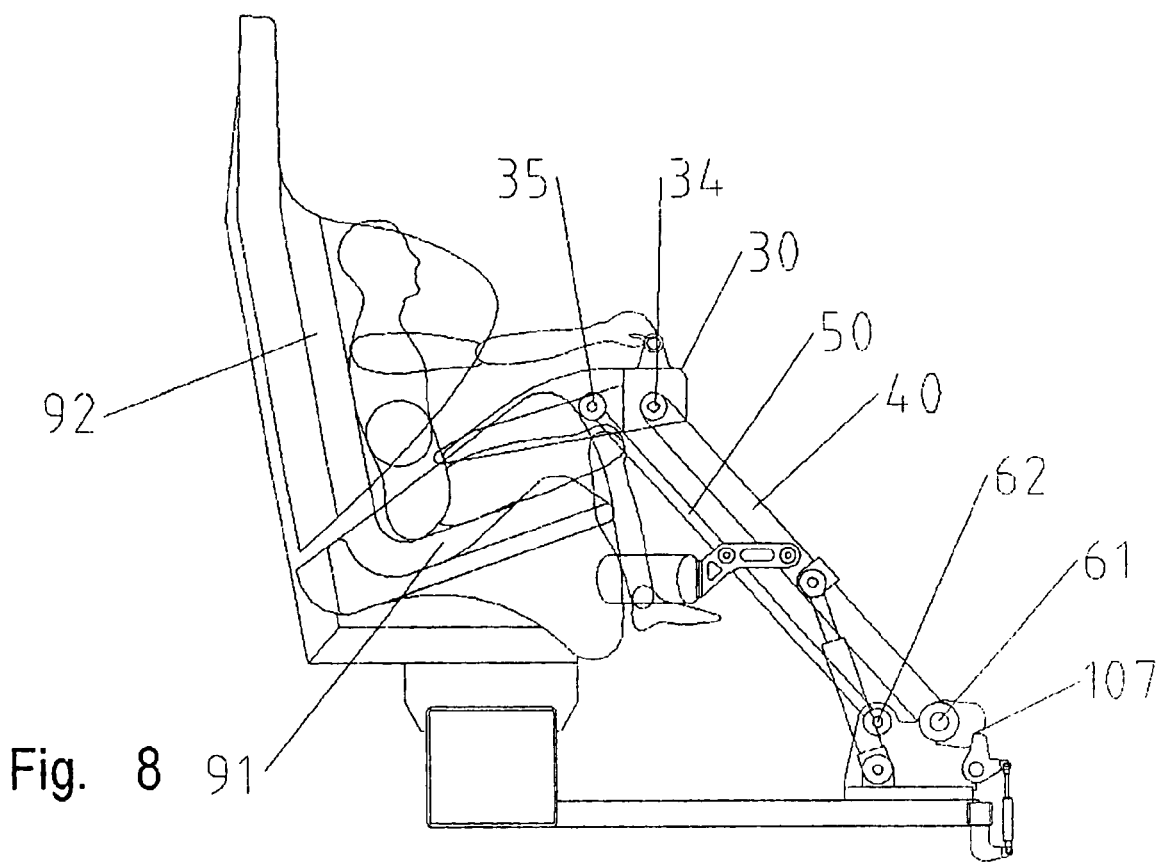

A preferred embodiment of the invention is described with reference to the accompanying Figures in which:

FIG. 1 shows a perspective side view of a passenger car with eight passenger spaces equipped with the restraint apparatus according to the invention, FIG. 2 shows a perspective view inclinedly from the side and from the front of a passenger seat with a restraint apparatus according to the invention in the opened condition, FIG. 3 shows a perspective view of the passenger seat of FIG. 2 in the closed condition, FIG. 4 shows a diagrammatic side view of the arrangement shown in FIG. 2 with a passenger in the passenger seat with the restraint apparatus in the opened position, FIG. 5 shows a diagrammatic side view as shown in FIG. 4 with the restraint apparatus in the half-opened position, FIG. 6 shows a diagrammatic side view as shown in FIG. 4 with the restraint apparatus in the closed position, FIG. 7 shows a diagrammatic side view as shown in FIG. 6 in use by a corpulent passenger, and FIG. 8 shows a diagrammatic side view as shown in FIG. 6 in use by a passenger of minor age.

FIG. 1 shows a passenger car which includes eight passenger seats 10a-h which are arranged on and fixed to a chassis 1 which in turn is guided and held on a rail system of a roller coaster by means of roller guide units 2-5.

Arranged in front of each of the passenger seats 10a-h is a passenger restraint apparatus 20a-h.

The individual passenger seats 10a-h and the passenger restraint apparatuses 20a-h respectively associated therewith are each of the same structure and are described hereinafter with reference to FIGS. 2 and 3.

The passenger seat 10a includes a seat shell 11 which comprises an anatomically shaped seat surface 12 and seat side portions 13 and 14 which laterally embrace the thighs and the pelvis of the seated passenger. The seat 10a further includes a backrest shell 15 which in similar fashion comprises a backrest surface 16 with a head support portion 16a formed thereon as well as the backrest side portions 17 and 18 which laterally embrace the shoulder and upper body region of the seated passenger.

Fixed on the underside of the seat shell 11 are two shaped bodies 30, 31 which are approximately in alignment with the seat side portions 13, 14 and project downwardly. Those shaped bodies 30, 31, on their mutually oppositely disposed wall surfaces, form lower leg contact surfaces which outwardly limit the mobility of the lower legs of the seated passenger.

The seat shell 11 and the backrest shell 15 are fixed rigidly on the platform 1 of the vehicle car. As can be seen the seat surface 12 and the backrest surface 16 are arranged at an angle of about 80° relative to each other and therefore force the passenger to adopt a seating posture with definedly angled hip joints. Optionally the seat can be designed or subsequently fitted with an insert cushion for children which bears against the backrest surface 16 and which advances the backrest contact surface by 50 mm and in order in that way to reduce the spacing of the backrest surface relative to the front edge of the seat by 50 mm and to permit the legs of the child to be angled at the knee joint in the desired fashion.

The seat shell and the backrest shell of the vehicle seat 10a are made from metal and are upholstered with a polyurethane (PU) foam layer in the region of all surfaces which come into contact with the passenger.

Arranged in front of the passenger seat 10a is a restraint apparatus 20a which includes a restraint body 30. The restraint body 30 includes a structure-bearing and shape-imparting metal core (not visible) which has PU foamed therearound on all sides and is thereby upholstered and cushioned. On its underside the restraint body 30 has a thigh support surface 31 which is anatomically shaped and which is adapted to bear against the thigh of the seated passenger. On its top side the restraint body 30 is of a contour which permits the forearms of the seated passenger to rest thereon. In addition, arranged on the side of the restraint body 30, that is remote from the passenger seat 10a, is a holding bow or yoke 33 which is oriented in transverse relationship with the direction of the thighs of the seated passenger and which at its two ends is provided with two handles which are inclined downwardly through 20° and which have enlarged handle ends to prevent the hands of the passenger from accidentally slipping off.

The restraint body 30 is connected by means of two pivotal levers 40, 50 arranged in parallel relationship, in a parallelogram-like structure, to a floor plate 1a which is fixed to the chassis 1 of the passenger car. One of the two parallel pivotal levers is a main arm 40 which carries the lateral and torsional forces which act on the restraint body 30 while the car is moving. The other of the two parallel pivotal levers is in the form of a secondary arm 50 and only serves to transmit tensile and pressure forces in order to achieve parallelogram guidance for the restraint body 30. The two pivotal levers are in the form of a dual tube construction.

The main arm 40 is mounted by means of a lower main arm pivot 41 to a lower mounting bracket 60 pivotably about a first lower pivot axis 61. The secondary arm 50 is also mounted to the lower mounting bracket 60 pivotably about a second lower pivot axis 62. The mounting bracket 60 is fixedly connected to the floor plate of the chassis 1. The first and second lower pivot axes 61, 62 are parallel to each other and spaced from each other in the longitudinal direction of the thigh of the seated passenger or in the direction of travel. The first and second pivot axes 61, 62 are disposed parallel to each other and are oriented in transverse relationship with the direction of the thighs and the direction of the lower legs of the seated passenger and are thus horizontal.

In addition, pivotably mounted to the mounting bracket 60 are two locking cylinder units 70, 71 which are arranged laterally of main and secondary bows or yokes and which are pivotably connected with their upper end to the main arm 40. The locking function of the locking cylinder units 70, 71 is implemented by way of electrically actuated solenoid valves (not shown). Upon actuation of the solenoid valves the passenger restraint apparatus is automatically opened by means of a pressure storage device (not shown) and can additionally be locked in the opened position in order to make it easier for the passengers to climb out. In addition the main arm 40 is provided with a mechanical latch which engages in the event of failure of the two locking cylinders 70, 71 and limits opening of the restraint body to a maximum dimension of 340 mm relative to the backrest.

FIG. 2 shows the restraint apparatus in an opened condition. FIG. 3 shows the restraint apparatus in a closed condition. As will be seen from a comparison of the two FIGS. 2 and 3 the closed condition is reached by pivotal movement of the main arm 40 and the secondary arm 50 about the two lower pivot axes 61, 62, in which case at the same time the restraint body 30 itself is pivoted about two upward axes 34, 35 and, by virtue of that pivotal movement which is imposed by the parallelogram guide arrangement by means of the two arms 40, 50, maintains its angular position in relation to the floor or in relation to the seat support surface of the passenger seat during the closing movement and consequently assumes the same angular orientation relative to the seat support surface both in the opened position of FIG. 2 and also in the closed position of FIG. 3. In addition the parallelogram guidance action for the restraint body 30 provides for a form of movement of the restraint body 30, which implements a substantially horizontal component at the edge of the restraint body that faces towards the passenger seat, that component being superposed by an only slight vertical component.

A redundant mechanical locking device 100 is arranged at the lower end of the main arm 40. The mechanical locking device 100 includes a locking projection 101 which is rigidly connected to the main arm 40 and which rotates jointly with the main arm 40 about the first lower rotary axis 61. Provided on the locking projection 101 are two locking surfaces 102, 103 which are oriented approximately perpendicularly to a tangential direction about the pivot axis 61.

The two locking surfaces 102, 103 co-operate with a locking body 105 which is mounted pivotably about a locking body axis 106 which is spaced from the first lower pivot axis 61 and which is oriented in parallel relationship with the first lower pivot axis 61. The locking body 105 engages with a locking edge 107 into one of the locking surfaces 102, 103 when the main arm 40 is pivoted into the closed position to such an extent that the locking surfaces 102 and 103 respectively pass into the region of the locking edge portion 107 of the locking body 105. Two locking positions for the main arm 40 are afforded by the provision of two locking surfaces 102 and 103.

At the upper end the main and secondary arms are let into the restraint body 30 and are mounted to the metal core of the restraint body 30 pivotably about an upper first pivot axis 34 and an upper second pivot axis 35 respectively, which are oriented in the same fashion as the lower first and second pivot axes 61, 62 and which are in mutually parallel relationship and which are spaced from each other in the direction of travel.

At about a mid-height position on the main and secondary arms 40, 50, a lower leg bow or yoke 80 is fixed in position by way of a main lower leg bow spindle 81 pivotably mounted to the main arm 40 and a secondary lower leg bow spindle 82 pivotably mounted to the secondary arm 50. In that way the lower leg bow 80 is guided in parallelogram configuration in that way in the same manner as the restraint body 30.

The lower leg bow 80 is U-shaped, wherein a base 83 of the lower leg bow serves as a contact surface for the front side of the lower legs of the passenger and two lateral limbs 84, 85 laterally embrace the lower legs of the passenger on the outside thereof.

The U-shaped lower leg bow 80 is thus fixed synchronously with respect to the parallelogram guidance action for the restraint body 30 to the two parallel main and secondary arms 40, 50 and, when the restraint apparatus is closed, forces the legs of the passenger to move into an angled position and causes them to be confined. The lower leg bow 80 in turn has a metallic core with PU foam therearound as upholstery and is of an elliptical cross-section in order in that way to provide for contact over a large area against the lower legs of the passenger and thus prevents pressure points and pain.

FIGS. 4 through 6 diagrammatically show the closing movement of the safety bow from an opened position into a closed position. As can be seen in FIG. 4 a sufficiently large space remains between the restraint apparatus in the open position and the passenger seat to enable the passenger to climb into the passenger seat.

From the opened position in FIG. 4 the restraint apparatus is moved into the closed position by pivotal movement of the main arm 40 and the secondary arm 50 about the lower pivot axes 61, 62 arranged in the floor region. In that case the restraint body 30 retains substantially or precisely in relation to the floor or the passenger seat surface, the angular position which it has already adopted in the opened condition, insofar as it is pivoted about the two upper axes 34, 35 in relation to the main arm 40 and the secondary arm 50.

FIG. 6 shows the restraint apparatus in the closed position. It will be seen that the restraint body 30 is oriented in the same angular position in relation to the floor as in the opened position of FIG. 4 or a partially opened position such as for example the position shown in FIG. 5. In the closed position shown in FIG. 6 the restraint body 30 bears with its thigh support surface 31 against the thighs of the passenger and in that way fixes the thighs in the passenger seat. In addition the lower leg bow 80 bears against the front side of the lower legs of the passenger and as a result forces them into a position of being angled through about 100° bend angle at the knee joint. It will further be seen from FIGS. 4 through 6 that the lower leg bow 80 assumes an angular position which is always the same with respect to the floor, in the opened position and also in a partially opened or in the closed position, which is ensured by the lower leg bow 80 also being guided in a parallelogram-like movement on the main arm 40 and the secondary arm 50.

As can be seen from FIGS. 4 through 6 the restraint body 30 is placed on the thighs of the passenger by the kinematics of the restraint apparatus according to the invention, with a path of movement which extends substantially horizontally and which involves only a slight vertical component of motion. FIG. 7 clearly shows the advantage of the form of movement achieved in that way for the restraint body 30 in relation to a corpulent passenger. As will be seen the path of movement of the restraint body 30 of the restraint apparatus according to the invention cannot be prevented by the protruding stomach region of the passenger, whereby a safe secure restraint function is achieved by correct placement of the restraint body going into the pelvic region of the passenger, even when corpulent passengers are involved.

FIG. 8 shows the restraint apparatus according to the invention functioning for restraining a child passenger in the passenger seat. For that purpose, fitted into the passenger seat is a booster cushioning which comprises a seat surface booster cushion 91 and a backrest booster cushion 92 and which provides that on the one hand the child comes to sit higher and on the other hand comes to sit further forwardly. That positioning of the child means that both the pelvic region and also the knee joint region of the child are arranged further forwardly in the seat than would be the case if a booster cushioning were not used. The booster cushioning thus makes it possible for the knee joint of the child to adopt a position at the front end of the seat support surface and for the lower leg consequently also to be angled as in the case of an adult passenger. This further provides that the pelvis of the child adopts a position such that the restraint body 30 can again ideally engage and restrain the thighs of the child extending into the pelvic region, thereby providing for safe secure fixing of the child.

FIGS. 4 through 6 further show the mode of operation of the mechanical locking device 100. As can be seen in FIG. 4 in the opened position of the restraint apparatus neither the locking surface 102 nor the locking surface 103 is in engagement with the locking edge 107 of the locking body 105. Pivotal movement of the main arm 40 causes the locking surfaces 102, 103 on the locking projection 101 to be pivoted with respect to the locking body 105 and come into latching engagement, as shown in FIG. 6, at a given pivotal angle which corresponds to a closed position of the restraint apparatus, with the locking edge 107 in such a way that the restraint apparatus is locked in the closed position. In that case two closed locking positions are made available by the locking surfaces 102, 103, as far as possible in each case the aim is to adopt the more advanced closed locking position which is locked by locking of the locking edge 107 at the locking surface 103.

The locking edge 107 on the locking body 106 is urged into the locking position by a controllable cylinder 108 and can be pivoted out of that locking position again by actuation of the cylinder 108.

The invention claimed is:

1. A passenger restraint apparatus for arrangement in front of a passenger seat of a funfair ride, said passenger restraint apparatus comprising:
   a restraint body (30) having a leg support surface (31) which is configured to be placed on the top side of the thighs of the passenger,
   a first guide lever (40) which is fixed at its first end to the restraint body and which is pivotably coupled with its second end in a floor region in front of the passenger seat of the funfair ride in such a way that the restraint body can be pivoted in relation to the passenger seat about a first lower axis (61) which is disposed in transverse relationship to the longitudinal axis of the thigh of the seated passenger from an opened position into a closed position,
   characterised in that
   the first guide lever is coupled at its first end to the restraint body pivotably about a first upper axis (34) which is disposed in parallel relationship with the first lower axis,
   arranged adjacent to the first guide lever is a second guide lever (50) which
   i. is spaced from the first guide lever in a direction in transverse relationship with the first lower axis and
   ii. is coupled at its first end to the restraint body pivotably about a second upper axis (35) which is arranged in parallel spaced relationship with the first upper axis and
   iii. is coupled at its second end pivotably about a second lower axis (62) arranged in parallel spaced relationship with the first lower axis in the region of a passenger footrest of the passenger seat of the funfair ride, in such a way
   iv. that the restraint body is guided by the first and second guide levers (40, 50) in the manner of a parallelogram or trapezium lever arrangement, and
   a lower leg bow (80) coupled to the first and second guide levers and guided by the first and second guide levers in the manner of a parallelogram or trapezium lever arrangement, the lower leg bow being arranged in transverse relationship with the longitudinal axis of the lower leg of the seated passenger in such a way that a knee bend angle of at least 90° is forced by the lower leg bow bearing against the front side of the lower legs of the seated passenger.

2. A passenger restraint apparatus as set forth in claim 1 characterised in that the first and second guide levers are guided in mutually parallel relationship.

3. A passenger restraint apparatus as set forth in claim 1 characterised in that the first and second guide levers are arranged in succession in the direction of the longitudinal axis of the thigh of the seated passenger.

4. A passenger restraint apparatus as set forth in claim 1 characterised by at least one linear actuator (70; 71) having a first end pivotably coupled to the first or second guide lever and a second end pivotably fixed in the floor region in front of the passenger seat of the funfair ride, the at least one linear actuator providing at least one of a pivotal movement of the restraint body between the opened and closed positions or a locking function for at least one of said positions.

5. A passenger restraint apparatus as set forth in claim 1, wherein the knee bend angle is at least 100°.

6. A passenger restraint apparatus as set forth in claim 1 characterised in that the lower leg bow is guided in parallel relationship with the restraint body.

7. A passenger restraint apparatus as set forth in claim 1 characterised in that the lower leg bow is of a U-shaped configuration with
   a first main portion (83) which is oriented in transverse relationship with the longitudinal axis of the lower leg and which bears against the front side of the two lower legs of the seated passenger, and
   two side horns (84, 85) which are arranged at the two ends of the main portion and which extend approximately in the direction of the longitudinal axis of the thigh of the seated passenger and bear laterally against the lower legs of the seated passenger.

8. A passenger restraint apparatus as set forth in claim 1 including a passenger seat having a seat surface (12) and a backrest surface (16), characterised in that the seat surface is at an angle of about 80° relative to the backrest surface.

9. A passenger restraint apparatus as set forth in claim 1 including a passenger seat having a seat surface (12) and a backrest surface (16), characterised in that provided on the underside of the seat surface are two lateral lower leg contact surfaces (31, 31) which bear laterally against the lower legs of the seated passenger.

10. A passenger restraint apparatus as set forth in claim 9 with a U-shaped lower leg bow, characterised in that the contact surfaces for the lower legs are arranged at the side horns (84, 85) of the U-shaped lower leg bow (80) in aligned relationship with the lower leg contact surfaces provided on the underside of the seat surface or lie within the region delimited by the lower leg contact surfaces.

11. A passenger car of a funfair ride, the passenger car comprising a chassis, at least one passenger space, and a passenger restraint apparatus according to claim 1, wherein the passenger space has a passenger seat with a floor region of the chassis in front of the passenger seat, and wherein the passenger restraint apparatus is arranged in front of the passenger seat.

12. A funfair ride comprising a passenger car according to claim 11.

13. A passenger restraint apparatus for arrangement in front of a passenger seat of a funfair ride, said passenger restraint apparatus comprising:
   a restraint body (30) having a leg support surface (31) which is configured to be placed on the top side of the thighs of the passenger, and
   a first guide lever (40) which is fixed at its first end to the restraint body and which is pivotably coupled with its second end in a floor region in front of the passenger seat of the funfair ride in such a way that the restraint body can be pivoted in relation to the passenger seat about a first lower axis (61) which is disposed in transverse relationship to the longitudinal axis of the thigh of the seated passenger from an opened position into a closed position, characterised in that the first guide fever is coupled at its first end to the restraint body pivotably about a first upper axis (34) which is disposed in parallel relationship with the first lower axis, arranged adjacent to the first guide lever is a second guide lever (50) which i. is spaced from the first guide lever in a direction in transverse relationship with the first lower axis and ii. is coupled at its first end to the restraint body pivotably about a second upper axis (35) which is arranged in parallel spaced relationship with the first upper axis and iii. is coupled at its second end pivotably about a second lower axis (62) arranged in parallel spaced relationship with the first lower axis in the region of a passenger footrest of the passenger seat of the funfair ride, in such a way iv. that the restraint body is guided by the first and second guide levers (40, 50) in the manner of a parallelogram or trapezium lever arrangement, and at least one linear actuator (70; 71) having a first end pivotably coupled to the first or second guide lever and a second end pivotably fixed in the floor region in front of the passenger seat of the funfair ride, the at least one linear actuator providing at least one of a pivotal movement of the restraint body between the opened and closed positions or a locking function for at least one of said positions.

14. A passenger restraint apparatus as set forth in claim 13 characterised in that the first and second guide levers are guided in mutually parallel relationship.

15. A passenger restraint apparatus as set forth in claim 13 characterised in that the first and second guide levers are arranged in succession in the direction of the longitudinal axis of the thigh of the seated passenger.

16. A passenger restraint apparatus as set forth in claim 13, characterised by a lower leg bow (80) which is coupled to at least one of the first and second guide levers and arranged in transverse relationship with the longitudinal axis of the lower leg of the seated passenger in such a way that a knee bend angle of at least 90° is forced by the lower leg bow bearing against the front side of the lower legs of the seated passenger.

17. A passenger restraint apparatus as set forth in claim 16, wherein the knee bend angle is at least 100°.

18. A passenger restraint apparatus as set forth in claim 16 characterised in that the lower leg bow is of a U-shaped configuration with a first main portion (83) which is oriented in transverse relationship with the longitudinal axis of the lower leg and which bears against the front side of the two lower legs of the seated passenger, and two side horns (84, 85) which are arranged at the two ends of the main portion and which extend approximately in the direction of the longitudinal axis of the thigh of the seated passenger and bear laterally against the lower legs of the seated passenger.

19. A passenger restraint apparatus as set forth in claim 13 including a passenger seat having a seat surface (12) and a backrest surface (16), characterised in that the seat surface is at an angle of about 80° relative to the backrest surface.

20. A passenger restraint apparatus as set forth in claim 13 including a passenger seat having a seat surface (12) and a backrest surface (16), characterised in that provided on the underside of the seat surface are two lateral lower leg contact surfaces (31, 31) which bear laterally against the lower legs of the seated passenger.

21. A passenger restraint apparatus as set forth in claim 20 with a U-shaped lower leg bow (80), characterised in that the contact surfaces for the lower legs are arranged at the side horns (84, 85) of the U-shaped lower leg bow in aligned relationship with the lower leg contact surfaces provided on the underside of the seat surface or lie within the region delimited by the lower leg contact surfaces.

22. A passenger car of a funfair ride, the passenger car comprising a chassis, at least one passenger space, and a passenger restraint apparatus according to claim 13, wherein the passenger space has a passenger seat with a floor region of the chassis in front of the passenger seat, and wherein the passenger restraint apparatus is arranged in front of the passenger seat.

23. A funfair ride comprising a passenger car according to claim 22.

* * * * *

UNITED STATES PATENT AND TRADEMARK OFFICE
CERTIFICATE OF CORRECTION

PATENT NO. : 7,677,671 B2  Page 1 of 1
APPLICATION NO. : 12/011261
DATED : March 16, 2010
INVENTOR(S) : Steininger et al.

It is certified that error appears in the above-identified patent and that said Letters Patent is hereby corrected as shown below:

In the Claims:

Claim 13, Col. 11, Line 5: delete "first guide fever" and insert --first guide lever--.

Signed and Sealed this

Eleventh Day of May, 2010

David J. Kappos
*Director of the United States Patent and Trademark Office*